United States Patent [19]

Bangala et al.

[11] Patent Number: 5,679,614
[45] Date of Patent: Oct. 21, 1997

[54] STEAM REFORMING CATALYST AND METHOD OF PREPARATION

[75] Inventors: Denis Ngoy Bangala, Ascot; Esteban Chornet, Sherbrooke, both of Canada

[73] Assignee: University of Sherbrooke, Sherbrooke, Canada

[21] Appl. No.: 382,992

[22] Filed: Feb. 3, 1995

[30]    Foreign Application Priority Data

Feb. 4, 1994 [CA] Canada .................................. 2114965

[51] Int. Cl.$^6$ ..................................................... B01J 23/40
[52] U.S. Cl. ........................... 502/302; 502/303; 502/305; 502/306; 502/313; 502/314; 502/315; 502/319; 502/323; 502/325; 502/326; 502/327; 502/337; 502/340; 502/341; 502/355
[58] Field of Search ...................................... 502/302, 320, 502/303, 305, 306, 313, 314, 315, 319, 323, 325, 326, 327, 337, 340, 341, 355

[56]                References Cited

U.S. PATENT DOCUMENTS 3,893,908   7/1975   Hensley, Jr. et al. .................... 208/136

Primary Examiner—Thurman K. Page
Assistant Examiner—Kathryne E. Shelborne
Attorney, Agent, or Firm—Nilles & Nilles

[57]                  ABSTRACT

A steam reforming catalyst including $Ni.Cr/MgO.La_2O_3.Al_2O_3$ is disclosed. Also disclosed is a method of preparing the catalyst. The catalyst is particularly useful for the catalytic reforming of paraffinic or polycyclic hydrocarbons by steam injection or similar methods. The catalyst has an improved useful life span, improved thermal and mechanical stability, a reduction of carbon deposits (coke) on the catalyst surface during its use, and may be readily regenerated once it is spent.

12 Claims, No Drawings

STEAM REFORMING CATALYST AND METHOD OF PREPARATION

FIELD OF THE INVENTION

The present invention relates to the catalytic reforming of paraffinic or polycyclic hydrocarbons by steam injection or similar methods. This technique is useful, among other things, in the production of hydrogen and synthesis gas. The present invention, without being restricted thereto, is particularly useful for the catalytic reforming of the following substances:

- tars found in incineration gases, gasification and pyrolysis of waste products, in particular, solid waste products;

- condensed ring aromatic fractions of by-products of petroleum refining (for example, tars such as anthracene, phenanthrene, naphthalene, methyl-naphthalene);

- methane gas used in the production of synthesis gas.

BRIEF DISCUSSION OF THE PRIOR ART

It is common in industry to effect hydrocarbon reforming in reactors, such as tubular, cyclic or adiabatic reactors, by directing a source of hydrocarbons mixed with steam on a catalyst, for example a nickel-based catalyst, mounted on a suitable support such as aluminum oxide. Known catalysts may comprise a variety of performance enhancing additives or other additives which may prolong their useful life cycle or which may allow the spent catalysts to be regenerated for further use.

The Prior Art Table, found below, lists most of the known and recently developed reforming catalysts. The technical comments provided in the rightmost column of Table I signals the drawbacks or disadvantages associated with the particular catalyst. Hence, there remains an important need for a catalyst having improved properties when compared to known catalysts.

PRIOR ART TABLE
NON-EXHAUSTIVE LIST OF REFORMING CATALYSTS

| Year of launch | Author of principal inventor | Catalyst | Targeted hydrocarbons | Technical comments |
|---|---|---|---|---|
| 1966 | Balshova[1] | $Ni/SiO_2$ | hexane | the support is not vapor resistant |
| 1967 | Bhatta[2] | $Ni/Al_2O_3$ | butane | rapid deactivation of the catalyst |
| 1972 | Stiles[3] | stabilized nickel oxides or nickel chromites | various hydrocarbons | low catalyst activity |
| 1975 | Edwin[4] | $Ni.Cr.K/Al_2O_3$ | methyl-naphthalene | incomplete conversion of methyl-naphthalene |
| 1977 | Kawagoshi[5] | Ni, Ag, La or Ce on an $Al_2O_3$ support | paraffinic hydrocarbons | low catalyst activity |
| 1978 | Grenoble[6] | Group VIIA periodic table elements on an alumina and silicon support | toluene | toluene conversion is generally not complete and is only about 17% when nickel is used |
| 1983 | Setzer[7] | Rh or Ni on an alumina support stabilized with a lanthanum oxide | sulfurous hydrocarbons | low resistance to abrasion and rapid loss of catalyst activity |
| 1984 | Sambrook[8] | co-precipitation of $Ni(NO_3)_2.6H_2O$ $Al(NO_3)_3.9H_2O$ $La(NO_3)_3.6H_2O$ | paraffinic hydrocarbons | low resistance to abrasion and low catalyst activity for polycyclic hydrocarbons |
| 1985 | Leftin[9] | Nickel oxide, Lanthanum oxide and/or Zirconium oxide | sulfurous hydrocarbons | low catalyst activity for polycyclic hydrocarbons |
| 1985 | Sambrook[10] | co-precipitation of $Ni(NO_3)_2.6H_2O$ $Al(NO_3)_3.9H_2O$ $La(NO_3)_3.6H_2O$ | paraffinic hydrocarbons | low resistance to abrasion and low catalyst activity for polycyclic hydrocarbons |
| 1985–1990 | (various sources) 11, 12, 13 and 14 | dolomite | naphthalene | naphthalene conversion is incomplete |
| 1988 | Yamashita[15] | $Pd/La_2O_3.Al_2O_3$ | paraffinic hydrocarbons | low catalyst activity |
| 1991 | Williams[16] | co-precipitation of metal salts of Ni, Al and Cr | paraffinic hydrocarbons | low resistance to abrasion, low catalyst activity for polycyclic hydrocarbons |

PRIOR ART TABLE
NON-EXHAUSTIVE LIST OF REFORMING CATALYSTS

| Year of launch | Author of principal inventor | Catalyst | Targeted hydrocarbons | Technical comments |
|---|---|---|---|---|
| 1991 | Numaguchi[17] | $Ni/Al_2O_3$ | methane | this catalyst is not adapted for the reforming of tars |
| 1991 | Michael[18] | $Ni/Al_2O_3$ <br> $Ni;W/Al_2O_3$ <br> $Ni;Mo;Zeolite$ | fluorene hydrocracking | this catalyst is not adapted for the reforming of tars |
| 1991 | Bonneau[19] | $Ni;W;K/Al_2O_3$ | methyl-naphthalene | the methyl-naphthalene is lower than 60% |
| 1991 | Corella[21] | methanization catalyst | tars | the catalyst has a useful life of about 34 hours |
| 1992 | Nunzru[22] | $CaO/Al_2O_3$ <br> $TiO_2/MgO$ | naphtha | rapid deactivation of the catalysts |
| 1992 | Terisita[23] | $Pt;Re/Al_2O_3$ | naphtha | rapid deactivation of the catalysts |
| 1992 | Bangala[24] | $NiO;CoO;CuO/SiO_2$ <br> (trade name: GB 98) | naphthalene | the catalyst has a useful life of about 34 hours |
| 1993 | Corella[25] | $Ni;Mg/Al_2O_3SiO_2$ <br> (trade mark: Topsoe R67 ™) | tars | the catalyst has a useful life of about 8 hours |

Prior art references found in Prior Art Table above:

1
Balashova, S. A.; Slovokhota, T. A. and Balandin, A. A., "Steam Reforming of cyclohexane", Kinet. Katal, 7, 303, 1966.
2
Bhatta, K. S. M. and Dixon, G. M., "Steam Reforming of n-butane", Trans, Faraday Soc., 63, 2217, 1967.
3
U.S. Pat. No. 3,645,915, Stiles.
4
U.S. Pat. No. 4,053,531, Kerr, E. R. et al.
5
U.S. Pat. No. 4,060,498, Kawagoshi et al.
6
Grenoble, D. C., "Steam Reforming of Toluene", J. Catal., 51 203, 1978.
7
U.S. Pat. No. 4,414,140, Setzer.
8
U.S. Pat. No. 4,469,815, Sambrook et al.
9
U.S. Pat. No. 4,539,310, Leftin et al.
10
U.S. Pat. No. 4,530,918, Sambrook et al.
11
Magne, P., Donnot, A., and Deglise, X. "Kinetics or Wood Tar Pyrolysis of Pine Bark", Trans, 3rd E. C. Conference, Venice, Italy, Mars 1985.
12
Donnot, A., Reningvolo, J., Magne, P., and Deglise, X., "Flash Pyrolysis of Tar from Pyrolysis of Pine Bark", J. Anal. and Appl. Pyrolysis, 8, 4012–4014, 1985.
13
Corella, J., Aznar, M. P., Cebrian, N., Iglesias, J. I., and Martinez, M. P., "Pyrolysis and Gasification", ed. Ferro, G. L., Elsevier Applied Sience, London, 264, 1989.
14
Simmell, P. A. and Bredenberg, J. B., "Catalytic Purification of Tarry Fuel Gas", Fuel, 69, 1219–1225, 1990.
15
U.S. Pat. No. 4,738,946, Yamashita et al.
16
U.S. Pat. No. 4,985,385, Williams et al.
17
Numaguchi, T., "Steam Reforming of Methane", Ind. Eng. Chem. Res., 30, 447–453, 1991.
18
Klein, M. T. et Lapinas, A. T. "Hydrocracking of Fluorene", Ind. Eng. Chem. Res., 30, 42–50, 1991.
19
Bonneau, L., Arnout, K., and Duprex, D., "Steam Reforming of 1-methylnaphthalene in the Presence of Sulfur on Nickel-Tungsten Alumina catalysts . . . ", Applied Catalysis, 74, 173–190, 1991.
20
Nihonmatsu, T. and Nomura, M., "Hydrocracking of Asphaltene", Ind. Eng. Chem. Res., 30, 1726–1734, 1991.
21
Corella, J. and Aznar, M. P., "Steam Gasification of Biomass in Fluidized Bed with a Secondary Catalytic Bed", Trans, Biomass for Energy and Industry, 5th EC Conference; et "Conversion and Utilization of Biomass", Vol. 2, Grassi eds, Elsevier Applied Science, London, 2749–1754, 1990.
22
Kunzru, D. and Basu, B., "Catalytic Pyrolysis of Naphtha", Ind. Eng. Chem. Res., 31, 146–155, 1992.
23
Teresita, F. G., and Carlos, R. A., "Industrial Regeneration of Naphtha Reforming Catalysts", Ind. Eng. Chem. Res., 31, 1283,1288, 1992.
24
Bangala, N. D., "Réformage à la vapeur du naphtalène", Doctoral Thesis (unplublished at this time), Sherbrooke University, Departement of chemical engineering, Sherbrooke, Québec, Canada.
25
Aznar M. P. and Corella J., "Improved Steam Gasification of Lignocellulosic Residues in a Fluidized Bed with Commercial Steam Reforming Catalysts" Ind Eng. Chem. Res., 32, 1–10, 1993.

Some of the catalysts listed in the Prior Art Table will now be discussed in further detail:

The Ni.Cr.K/$Al_2O_3$ catalyst taught in U.S. Pat. No. 4,053,531 is hampered by the following drawbacks:
- the conversion of the methyl-naphthalene is incomplete;
- the method of preparation of the catalyst described in the patent makes the shaping of the catalyst quite difficult and fails to provide a good dispersion of the nickel on the catalytic surface. This of course causes problems with the reproducibility of the invention and its potential industrial application.

The NiO.CoO.CuO/$SiO_2$ catalyst (trade name GB 98) will now be commented upon. This catalyst is used in industry. The conversion of the naphthalene is complete. However, the catalyst is hampered by the following drawbacks:
- short useful lifespan (not more than 22 hours);
- the silica support does not offer good mechanical and thermal stability.

The Ni.Mg/$Al_2O_3SiO_2$ catalyst (trade mark: Topsoe R67™) will now be commented upon. The catalyst is hampered by the following drawbacks:
- the conversion of tars is almost complete but the catalyst quickly becomes inactive (life span of less than 10 hours);
- lack of thermal stability.

To better illustrate the differences between the catalyst of the present invention and those of the prior art, it is important to draw a distinction between reforming of polycyclic hydrocarbons (comprising, inter alia, anthracene, phenanthrene, naphthalene, methyl-naphthalene, . . . ) and paraffinic hydrocarbons (comprising, inter alia, methane, propane, butane, . . . ). The chemical reaction mechanisms intervening during the reforming of polycyclic hydrocarbons are more complex than these paraffinic hydrocarbons. Consequently, during reforming of polycyclic hydrocarbons, the properties of the catalyst(s) used require particular attention. Among other things, reforming of polycyclic hydrocarbons requires close control of the properties of the active surface of the catalyst as well as good thermal and mechanical stability of the catalyst, especially in industrial applications where operating conditions are oftentimes adverse. Another important factor is the requirement of a rather long, active life span and the opportunity of regenerating the catalyst or to be able to safely dispose of the spent catalyst.

The method of preparation (precipitation or co-precipitation) described in the prior art patents, makes it difficult to appropriately shape the catalyst and does not allow good dispersion of the nickel on the surface of the catalyst. This, in turn, generates difficulties in reproducing these inventions, especially in industrial applications.

In U.S. Pat. No. 4,738,946 Yamashita et al. describe a Pd/$La_2O_3$.$Al_2O_3$ catalyst having good stability characteristics even at elevated temperatures. However, the catalyst is prepared by calcination at very high temperatures (1200° C.). Such elevated temperatures unfortunately result in a disadvantageous reduction in the active surface area of the support and a low dispersion rate of the noble metals or of the catalyst agent caused by coalescence. Consequently, the activity of the catalyst is reduced and its potential application becomes limited to the reforming of paraffinic hydrocarbons.

The catalyst described in U.S. Pat. No. 4,530,918 is said to be prepared by co-precipitation of $Ni(NO_3)_2.6H_2O$, $Al(NO_3)_3.9H_2O$, and $La(NO_3)_3.6H_2O$; calcination at 450° C. and reduction at 600° C. in the presence of hydrogen. Hydrogen reduction has the disadvantage of causing a cutting-back on the number of active sites which play an important role in the reforming of polycyclic hydrocarbons. Also, this catalyst has a low resistance to abrasion forces and its application is limited to the reforming of paraffinic hydrocarbons.

Williams et el. in U.S. Pat. No. 4,985,385 teach a catalyst prepared by co-precipitation of nickel, aluminum and chrome salts. The co-precipitate is calcined at 450° C., reduced in the presence of hydrogen at 500° C. Once again, because of the high temperatures during the calcination and reduction steps, this catalyst is hampered by the same drawbacks as the catalyst described in U.S. Pat. No. 4,530,918 (Sambrook).

Kawagoshi et el. teach in U.S. Pat. No. 4,060,498 as catalyst composed of nickel, silver, lanthanum or cerium on an alumina support. During its preparation, the catalyst is calcined at 900° C. It is noted that a calcination temperature above 800° C., implies the disadvantageous reduction of the surface area of the support and the coalescence of the catalyst metal, thereby reducing the activity of the resulting catalyst.

Stiles in U.S. Pat. No. 3,645,915 describes a catalyst comprising nickel oxide mixed with a nickel chromite and stabilized by a lanthanum oxide or uranium oxide. It is said that cerium, thorium oxide, magnesium oxide and manganese oxide can be used as additives. The catalyst is prepared by precipitation or impregnation (dipping). It is noted that for a nickel concentration above 5%, the rate of nickel dispersion is low. Furthermore, the catalyst is prepared by calcination at a temperature above 800° C. (1000° C.). Consequently, this catalyst is hampered by the drawbacks of the catalyst described in U.S. Pat. No. 4,060,498 (Kawagoshi) and can only be used for the reforming of paraffinic hydrocarbons.

Sambrook et al. in U.S. Pat. No. 4,469,815 teach a catalyst whose composition, method of preparation and conditions of preparation are identical to those described in U.S. Pat. No. 4,530,918 (Sambrook). The catalyst offers little resistance to abrasion and its use is limited to the reforming of paraffinic hydrocarbons.

Setzer in U.S. Pat. No. 4,414,140 describes a catalyst comprising a catalyst agent comprising rhodium or nickel supported on an alumina support stabilized with a lanthanum oxide. It is noted that the catalyst support is prepared by calcination at a temperature of 1036° C. resulting in a reduction of the specific surface of the support. Furthermore, the catalyst is prepared by impregnation of the support in a solution of $Rh(NO_3)_3$ and reduction at 316° C. In this case, a reduction temperature lower than 500° C. fails to promote interaction and bonding between the catalyst metal and the support. Consequently, the resulting catalyst shows little resistance to abrasion and a loss of activity caused by dilution of the catalyst metal away from the catalyst support.

Leftin et al. in U.S. Pat. No. 4,539,310 describe a catalyst which may comprise nickel oxide, lanthanum oxide and zirconium dioxide. The catalyst is prepared by multiple impregnation of nickel and lanthanum on a zirconium dioxide support followed by calcination and hydrogen reduction. This preparation method makes the shaping of the resulting catalyst difficult. Hydrogen reduction unfortunately reduces the number of active sites responsible for the reforming of polycyclic hydrocarbons.

Consequently, it is clearly established that there remains a great need for an improved catalyst which is not hampered with the drawbacks associated with the prior art. In particular, there is a need in industry for a steam reforming catalyst which will have a rather long useful life span and which will show good thermal and mechanical stability.

The main object of the present invention is to remove the various drawbacks associated with the prior art and to provide a catalyst having improved useful life span, improved thermal and mechanical stability, a reduction of carbon deposits (coke) on the catalyst surface during its use, and a catalyst which may be readily regenerated once it is spent.

A further object of the present invention is to provide a catalyst having improved activity for the reforming of either paraffinic or polycyclic hydrocarbons.

A still further object of the present invention is to provide a method preparation of the novel catalyst of the present invention.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

The present invention provides a steam reforming catalyst having the approximate chemical composition: $Ni.Cr/MgO.La_2O_3.Al_2O_3$.

Also provided in the present invention is a method of preparing a catalyst for steam reforming of hydrocarbons, said catalyst having the approximate chemical composition: $Ni.Cr/MgO.La_2O_3.Al_2O_3$, said method comprising the following steps wherein weight percentages are expressed as weight percentages per total weight of catalyst:

(a) preparing a catalyst support by mixing about 5% of lanthanum oxide, 10% of magnesium oxide and 65% aluminum oxide;

(b) calcining the resulting mixture;

(c) adding nickel and chrome to the calcined support obtained in step (b) to complete the approximate chemical composition of said catalyst;

wherein each element of said approximate chemical composition is found in the following percentages per weight of catalyst:

| Chemical composition | Weight % |
| --- | --- |
| Ni | 15% |
| MgO | 10% |
| Cr | 5% |
| $Al_2O_3$ | 65% |
| $La_2O_3$ | 5% |

(d) shaping of said catalyst.

It is to be noted that the sequence of steps (b) and (c) is not important to the present invention.

In a preferred embodiment of the present invention there is provided a method of preparing a catalyst for steam reforming of hydrocarbons, said catalyst having the approximate chemical composition: $Ni.Cr/MgO.La_2O_3.Al_2O_3$, said method comprising the following steps wherein weight percentages are expressed as weight percentages per total weight of catalyst:

(a) preparing a catalyst support by mixing about 5% of lanthanum oxide, 10% of magnesium oxide and 65% aluminum oxide;

(b) calcining the resulting mixture at about 700° to 800° C. for about 6 hours;

(c) adding about 15% of nickel to the calcined support obtained in step (b) by precipitating thereon a nickel precursor;

(d) drying of the resulting mixture of step (c);

(e) adding about 5% of chrome to the calcined support obtained in step (d) by precipitating thereon a chrome precursor;

(f) drying of the resulting mixture of step (e);

(g) shaping of the resulting catalyst;

wherein each element of said approximate chemical composition of said catalyst is found in the following percentages per weight of catalyst:

| Chemical composition | Weight % |
| --- | --- |
| Ni | 15% |
| MgO | 10% |
| Cr | 5% |
| $Al_2O_3$ | 65% |
| $La_2O_3$ | 5% |

It is to be noted that the sequence of steps (c) and (e) can be inverted and is not important to the present invention.

DETAILED DESCRIPTION

The catalyst of the present invention has the following approximate chemical composition: $Ni.Cr/MgO.La_2O_3.Al_2O_3$ In a preferred embodiment, each element of said approximate chemical composition is found in the following approximate percentages per weight of catalyst:

| Chemical composition | Weight % |
| --- | --- |
| Ni | 15% |
| MgO | 10% |
| Cr | 5% |
| $Al_2O_3$ | 65% |
| $La_2O_3$ | 5% |

The catalyst provides, inter alia, the following advantages:

- a total or nearly total conversion of polycyclic hydrocarbons such as the naphthalene molecule;
- a good mechanical and thermal stability and generally superior to the catalysts of the prior art listed in Prior Art Table above;
- a useful life span in excess of 60 hours;
- a resumption of catalyst activity following regeneration of spent catalyst.

These advantages are particularly useful in industrial applications.

The performance of the catalyst of the present invention was compared to the performance of a known commercial catalyst, namely GBi98 (trade name) which consists essentially of $NiO.CoO.CuO/SiO_2$. The comparison was made by using the two catalysts for the steam reforming of a polycyclic hydrocarbon, namely naphthalene. The performance comparison was made on various levels, including useful life span and the degree of carbon deposits (coke) during use of the catalysts. The operating conditions were closely matched. The results of this comparison are summarized in Tables 1, 2 and 3, below.

TABLE 1

LIFE SPAN OF CATALYST GB-98 OPERATING CONDITIONS AND RESULTS

| Reaction time (hours) | 4 | 8 | 12 | 16 | 20 | 22 |
|---|---|---|---|---|---|---|
| Temperature, °C. | 750 | 750 | 750 | 750 | 750 | 750 |
| Residuence time, s | 0.5 | 0.5 | 0.5 | 0.5 | 0.5 | 0.5 |
| Molecular ratio: water/naphthalene | 19 | 19 | 19 | 19 | 19 | 19 |
| Atmospheric pressure | | | | | | |
| Gas products (mol %) | | | | | | |
| Hydrogen | 66.0 | 66.7 | 67.8 | 69.6 | 70.0 | 70.8 |
| Carbon monoxide | 10.7 | 11.1 | 8.7 | 6.9 | 4.8 | 4.4 |
| Carbon dioxide | 19.0 | 18.8 | 20.9 | 21.9 | 23.4 | 24.0 |
| Methane | 1.2 | 1.3 | 0.7 | 0.5 | 0.1 | 0.1 |
| Naphthalene conversion (%) | 100 | 100 | 100 | 100 | 100 | 100 |
| Gas yield (%) | 88.2 | 81.8 | 67.1 | 52.7 | 40.7 | 38.3 |
| Coke yield (%) | 11.6 | 18.0 | 26.0 | 43.3 | 57.6 | 60.4 |

TABLE 2

LIFE SPAN OF THE CATALYST OPERATING CONDITIONS AND RESULTS

| Reaction time (hours) | 4 | 8 | 12 | 16 | 20 | 24 | 28 | 32 | 36 | 40 | 44 | 48 | 52 | 56 | 60 |
|---|---|---|---|---|---|---|---|---|---|---|---|---|---|---|---|
| Temperature, °C. | 750 | 750 | 750 | 750 | 750 | 750 | 750 | 750 | 750 | 750 | 750 | 750 | 750 | 750 | 750 |
| Residence time, s | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Molecular ratio: water/naphthalene | 18 | 18 | 18 | 18 | 18 | 18 | 18 | 18 | 18 | 18 | 18 | 18 | 18 | 18 | 18 |
| Atmospheric pressure | | | | | | | | | | | | | | | |
| Gas products (mol %) | | | | | | | | | | | | | | | |
| Hydrogen | 62.9 | 65.1 | 63.3 | 61.8 | 62.4 | 63.3 | 62.7 | 63.0 | 64.8 | 61.9 | 64.5 | 63.8 | 64.3 | 66.6 | 65.8 |
| Carbon monoxide | 19.3 | 18.2 | 20.2 | 19.7 | 19.2 | 17.3 | 18.2 | 18.2 | 16.7 | 18.8 | 15.1 | 16.7 | 15.9 | 15.1 | 16.0 |
| Carbon dioxide | 14.6 | 14.5 | 13.8 | 15.2 | 16.3 | 16.2 | 15.4 | 16.7 | 16.4 | 17.9 | 16.9 | 17.8 | 17.1 | 16.5 | |
| Methane | 3.2 | 2.2 | 2.7 | 3.3 | 1.4 | 3.1 | 2.9 | 3.3 | 1.7 | 2.8 | 2.5 | 2.4 | 1.9 | 1.1 | 1.6 |
| Naphthalene conversion (%) | 100 | 100 | 100 | 100 | 100 | 100 | 100 | 100 | 100 | 100 | 100 | 100 | 100 | 100 | 100 |
| Gas yield (%) | 99.6 | 98.2 | 98.4 | 98.6 | 96.7 | 98.4 | 97.3 | 96.4 | 96.2 | 95.8 | 94.4 | 93.8 | 92.8 | 91.8 | 87.6 |
| Coke yield (%) | 0.4 | 0.8 | 1.6 | 1.4 | 2.2 | 1.3 | 2.6 | 3.4 | 3.8 | 4.2 | 5.6 | 6.1 | 7.0 | 8.0 | 12.1 |

TABLE 3

LIFE SPAN OF REGENERATED CATALYST OPERATING CONDITIONS AND RESULTS

| Reaction time (hours) | 2 | 4 | 6 | 8 |
|---|---|---|---|---|
| Temperature, °C. | 750 | 750 | 750 | 750 |
| Residence time, s | 0.5 | 0.5 | 0.5 | 0.5 |
| Molar ratio: water/naphthalene | 18 | 18 | 18 | 18 |
| Atmospheric pressure | | | | |
| Gas products (mol %) | | | | |
| Hydrogen | 65.8 | 67.2 | 64.3 | 66.6 |
| Carbon monoxide | 17.5 | 17.8 | 17.1 | 17.7 |
| Carbon dioxide | 15.8 | 14.4 | 14.3 | 14.8 |
| Methane | 0.8 | 0.6 | 0.7 | 0.8 |
| Naphthalene conversion (%) | 100 | 100 | 100 | 100 |
| Gas yield (%) | 98.4 | 8.6 | 98.2 | 98.4 |
| Coke yield (%) | 1.6 | 1.4 | 1.8 | 1.6 |

According to the results of Tables 1, 2 and 3, above, it is demonstrated that the useful life span of the catalyst of the present invention is approximately 3 times longer than of the GB-98 (tradename) catalyst. This advantage of the catalyst of the present invention over prior art catalysts is very important in industrial applications where downtime between the replacement of spent catalyst must be minimized. Another important advantage is that the catalyst of the present invention appears to be less prone to carbon deposits (coke) during use when compared to the prior art catalyst. Consequently, the performance characteristics of the catalyst of the present invention are surprisingly good. Under controlled operating conditions (reaction temperature of 750° C., hydrocarbon product residence time of 0.5 sec, molar ratio of $H_2O$/naphthalene of 18, and under atmospheric pressure), TABLE 2 shows that the conversion of naphthalene is total, i.e. 100%, the useful life span (prior to regeneration) of the catalyst is 60 hours, weight loss of the catalyst during that time is about 10 to 15%, carbon deposition is minimal and the catalyst resumes its activity after regeneration in accordance with methods well known to those skilled in the art. TABLE 3, above, demonstrates that the catalyst resumes its performance and activity after regeneration.

EXPERIMENTAL

Other characteristics and advantages of the present invention will appear from the following examples provided for illustrative purposes only. More particularly, possible methods for the preparation of the catalyst of the present invention will be provided by means of examples.

EXAMPLE 1

This example provides one possible method of preparing the catalyst of the present invention. Firstly, the catalyst support is prepared. This is accomplished by mixing 19.5 g of aluminum oxide (gamma) to 1.5 g of lanthanum oxide ($La_2O_3$) and 3 g of magnesium oxide. This mixture was then calcined at temperatures between 700° and 800° C., preferably 750° C., for about 6 hours and cooled to ambient temperature. Following this treatment, the catalyst support was tagged as sample "A". Subsequently, 11.5 g of chrome nitrate $Cr(NO_3)_3.9H_2O$ were mixed to sample "A" to form sample "B". Sample "B" was dried at a temperature of 110° C. for 20 hours. Subsequently, 22.3 g of nickel nitrate $Ni(no_3)_2.6H_2O$ were mixed with the dried sample "B" to form sample "C", which was also dried at 110° C. for 20 hours. Afterwards, 25 ml of a 1N solution of nitric acid were mixed with sample "C" to form an extrudable paste "C" and was extruded in disk-like shapes. These green shapes were dried at 110° C. for 4 hours and calcined at 800° C. for 6 hours. The resulting catalyst was termed "BD29". The catalyst displays good mechanical and thermal stability, and the conversion of naphthalene can reach 92%. Accordingly, the catalyst of the present invention can be advantageously used for the conversion of tars containing somewhat less than 20% of naphthalene.

EXAMPLE 2

This example describes a preferred embodiment of the present invention. Firstly, the catalyst support is prepared. This is accomplished by mixing 39 g of aluminum oxide (gamma) to 3 g of lanthanum oxide ($La_2O_3$) and 6 g of magnesium oxide. This mixture was then calcined at temperatures between 700° and 800° C., preferably 750° C., for about 6 hours and cooled to ambient temperature. The resulting mixture was tagged as sample "A". Subsequently, 23 g of chrome nitrate $Cr(NO_3)_3.9H_2O$ were mixed to sample "A" to form sample "B". Sample "B" was dried at a temperature of 110° C. for 20 hours. Subsequently, 44.6 g of nickel nitrate $Ni(no_3)_2.6H_2O$ were mixed with the dried sample "B" to form sample "C", which was also dried at 110° C. for 20 hours. Afterwards, 50 ml of a 1N solution of nitric acid were mixed with sample "C" to form an extrudable paste "C" and was extruded in disk-like shapes. These green shapes were dried at 110° C. for 4 hours and calcined at 550° C. for 6 hours. The resulting catalyst was termed "BD30". The catalyst displays the sought after properties for the steam reforming of paraffinic or polycyclic hydrocarbons, for example, the tars found in incineration, gasification and pyrolysis gases of solid waste products (conversion of solid wastes to energy).

Accordingly, in general terms, the method of preparation of the catalyst of the present invention can be summarized as follows, wherein the catalyst has the following approximate chemical composition: $Ni.Cr/MgO.La_2O_3.Al_2O_3$, the method comprises the following steps wherein weight percentages are expressed as weight percentages per total weight of catalyst:

(a)

preparing a catalyst support by mixing about 5% of lanthanum oxide,

10% of magnesium oxide and 65% aluminum oxide;

(b)

calcining the resulting mixture;

(c)

adding nickel and chrome to the calcined support obtained in step (b) to complete the approximate chemical composition of said catalyst;

wherein each element of said approximate chemical composition is found in the following percentages per weight of catalyst:

| Chemical composition | Weight % |
|---|---|
| Ni | 15% |
| MgO | 10% |
| Cr | 5% |
| $Al_2O_3$ | 65% |
| $La_2O_3$ | 5% |

(d)

shaping of said catalyst.

It is of course to be understood that the present invention is not limited to the examples described herein. Other methods of preparing the catalyst of the present invention can be readily conceived without departing from the spirit of the present invention. For example, the drying and calcining sequences could be modified by those skilled in the art of preparing such catalysts. Furthermore, additional steps could complete the methods of preparation described herein.

For example, and as described in the examples above, the shaping step can be effected by mixing the resulting catalyst with an inert solvent such as nitric acid, preferably 1N, in order to form an extrudable paste which can be extruded and cut into disk-like shapes which can then be dried at about 110° C. for about 4 hours and then calcined, preferably at about 550 to 800° C. for about 6 hours. The resulting calcined disk-like shapes would then be easily manipulated and adapted to be advantageously used in the required industrial setting.

Although the invention has been described above with respect to one specific form, it will be evident to a person skilled in the art that it may be modified and refined in various ways. It is therefore wished to have it understood that the present invention should not be limited in scope, except by the terms of the following claims.

I claim:

1. A steam reforming catalyst comprising: $Ni.Cr/MgO.La_2O_3.Al_2O_3$, wherein said steam reforming catalyst consists of the following percentages per weight of catalyst:

| | |
|---|---|
| Ni | 15%; |
| MgO | 10%; |
| Cr | 5%; |
| $Al_2O_3$ | 65%; and |
| $La_2O_3$ | 5%. |

2. A method of preparing a catalyst for steam reforming of hydrocarbons, said catalyst including: $Ni.Cr/MgO.La_2O_3.Al_2O_3$, said method comprising the following steps, wherein weight percentages are expressed as weight percentages per total weight of catalyst:

(a)

preparing a catalyst support by mixing about 5% of lanthanum oxide, 10% of magnesium oxide and 65% aluminum oxide;

(b)

calcining the resulting mixture; and (c)

adding nickel and chrome to the calcined support obtained in step (b) to complete the approximate chemical composition of said catalyst for stem reforming of hydrocarbons; wherein said catalyst for stem reforming of hydrocarbons includes the following percentages per weight of catalyst:

| | |
|---|---|
| Ni | 15%; |
| MgO | 10%; |
| Cr | 5%; |
| $Al_2O_3$ | 65%; and |
| $La_2O_3$ | 5%; and |

(d)

shaping said catalyst.

3. A method as in claim 2, wherein the sequence of steps (b) and (c) is inverted.

4. A method of preparing a catalyst for steam reforming of hydrocarbons, said catalyst including $Ni.Cr/MgO.La_2O_3.Al_2O_3$, said method comprising the following steps wherein weight percentages are expressed as weight percentages per total weight of catalyst:

(a)

preparing a catalyst support by mixing about 5% of lanthanum oxide, 10% of magnesium oxide and 65% of aluminum oxide;

(b)
  calcining the resulting mixture at about 700° to 800° C. for about 6 hours;
(c)
  adding about 15% of nickel to the calcined support obtained in step (b) by precipitating thereon a nickel precursor;
(d)
  drying the resulting mixture of step (c);
(e)
  adding about 5% of chrome to the calcined support obtained in step (d) by precipitating thereon a chrome precursor;
(f)
  drying the resulting mixture of step (e); and
(g)
  shaping the resulting catalyst;
wherein said catalyst for steam reforming of hydrocarbons includes the following percentages per weight of catalyst:

| | | |
|---|---|---|
| Ni | 15%; | |
| MgO | 10%; | |
| Cr | 5%; | |
| $Al_2O_3$ | 65%; and | |
| $La_2O_3$ | 5%. | |

5. A method as in claim 4, wherein the precursors in steps (c) and (e) are nickel nitrate and chrome nitrate, respectively.

6. A method as in claims 4 or 5, wherein the sequence of steps (c) and (e) are inverted.

7. A method as in claims 4 or 5, wherein calcination step (c) is conducted at about 750° C. for about 6 hours.

8. A method as in claim 7, wherein drying steps (d) and (f) are conducted at about 110° C. for about 20 hours.

9. A method as in claim 8, wherein the sequence of steps (c) and (e) is inverted.

10. A method as in claim 8, wherein the shaping of said resulting catalyst in shaping step (g) is conducted by adding an inert solvent to said resulting catalyst thereby obtaining an extrudable paste which may be shaped in a desired form and calcined to remove said insert solvent.

11. A method as in claim 10, wherein said insert solvent is nitric acid 1N.

12. A method as in claim 10, further comprising extruding said extrudable paste in disk-shaped pieces, drying the disk-shaped pieces at about 110° C. for about 4 hours and then calcining the dried pieces at about 550° C. for about 6 hours.

* * * * *